United States Patent
Falbel

[11] 3,923,039
[45] Dec. 2, 1975

[54] SOLAR ENERGY HEATING SYSTEM

[76] Inventor: Gerald Falbel, 472 Westover Road, Stamford, Conn. 06902

[22] Filed: Feb. 7, 1975

[21] Appl. No.: 547,917

[52] U.S. Cl. ............................... 126/271; 126/270
[51] Int. Cl.² ............................................. F24J 3/02
[58] Field of Search ............ 126/270, 271; 237/1 A; 62/2; 350/288, 293, 294

[56] References Cited
UNITED STATES PATENTS

| | | | |
|---|---|---|---|
| 3,179,105 | 4/1965 | Falbel | 126/271 |
| 3,262,493 | 7/1966 | Hervey | 126/271 |
| 3,841,302 | 10/1974 | Falbel | 126/271 |
| 3,884,217 | 5/1975 | Wartes | 126/270 |

FOREIGN PATENTS OR APPLICATIONS

| | | | |
|---|---|---|---|
| 1,243,221 | 4/1960 | France | 126/271 |
| 1,287,760 | 2/1962 | France | 126/270 |

*Primary Examiner*—Kenneth W. Sprague
*Assistant Examiner*—James C. Yeung
*Attorney, Agent, or Firm*—Joseph Levinson, Esq.

[57] ABSTRACT

A focused solar heating system is provided having a focusing reflector which is generally scoop-shaped. A solar collector plate is mounted on the front of the focusing reflector to directly accept direct solar radiation and diffuse radiation which strikes the front surface of the plate. The remainder of the entrance aperture of the focusing reflector accepts both on- and off-axis solar direct and diffuse radiation which is reflected by the focusing reflector and applied to the rear surface of the solar collector plate. The focusing reflector has a concave reflective surface made up of first and second merging curves which are optimized so that the front and rear surfaces of the solar collector plate accept the larger solid angle of both direct and diffuse rays from the sun and provides an optical gain which increases the efficiency of the system. The solar collection system may be incorporated in a vertical wall of a building and made partially transmissive, or may be incorporated in a separate structure for supplementing the heating or cooling of a building or providing hot water therefor.

10 Claims, 3 Drawing Figures

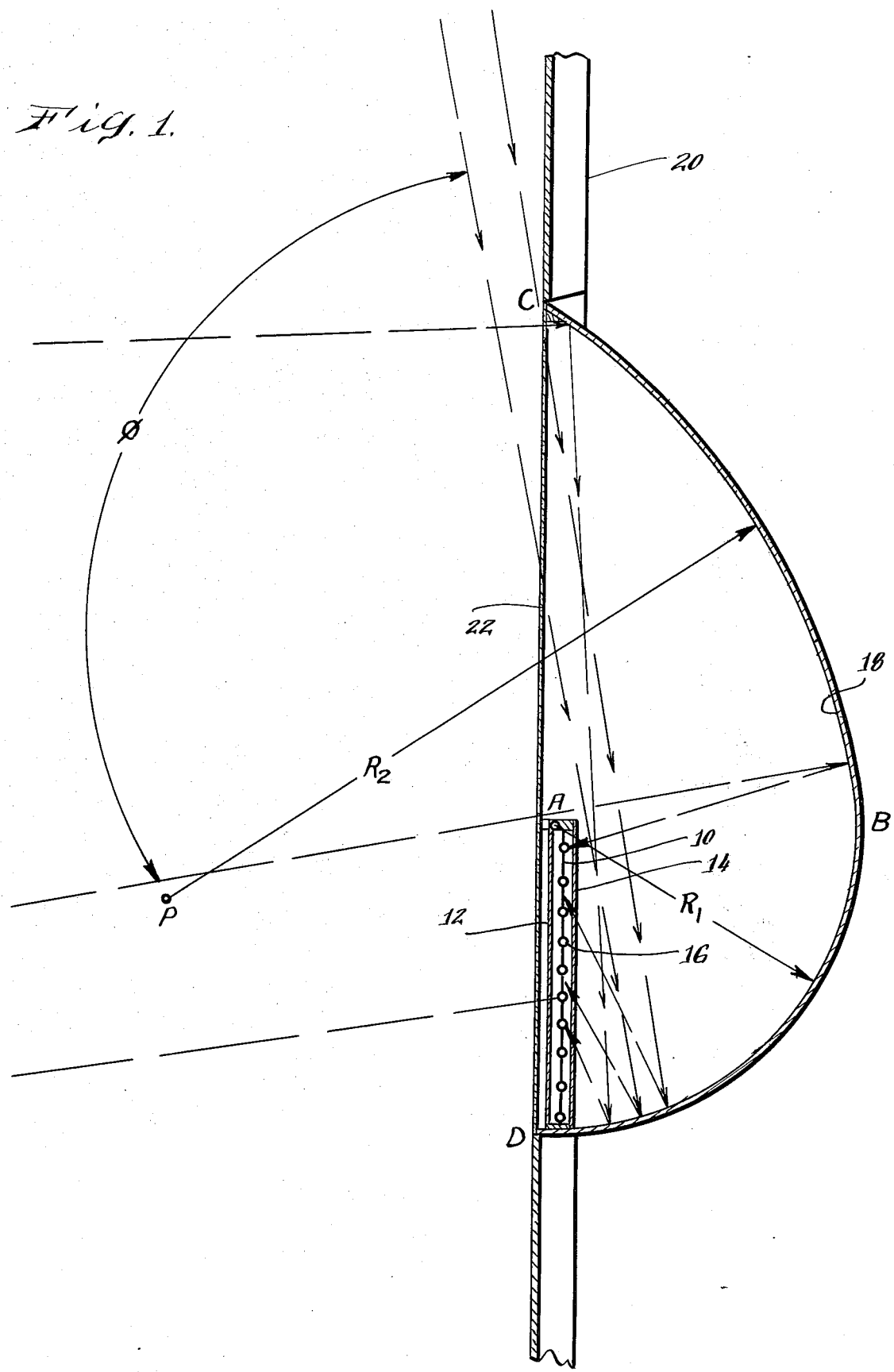

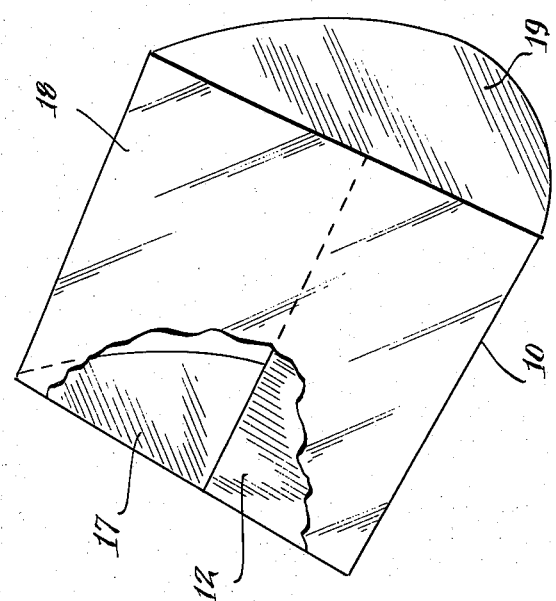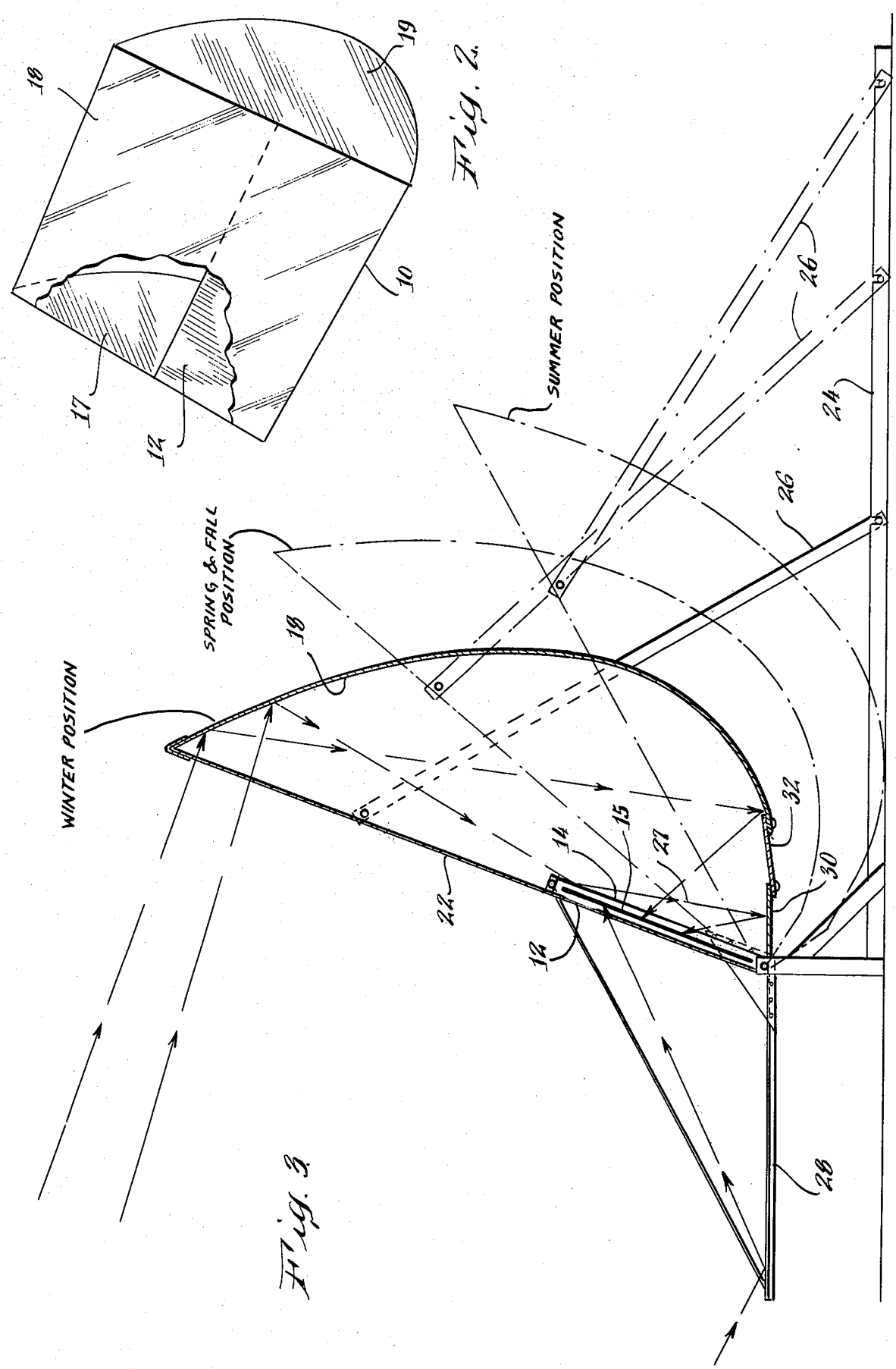

SOLAR ENERGY HEATING SYSTEM

BACKGROUND OF THE INVENTION

This invention relates to a solar energy system, and more particularly to focusing solar collectors which optimize the collection of solar radiation, both direct and diffuse, and provide an optical gain for the collection of such energy.

Solar energy has been proposed for the heating and/or cooling of structures, but because of readily available and cheap forms of other energy, such as coal, oil and gas, such applications have been limited mainly for economic reasons. With the advent of energy shortages it has now become essential to tap this huge, readily available energy source. Many of the solar energy systems which have been proposed for converting the sun's energy into heat, generally require rather large collectors or reflectors which are unsightly, uneconomical, difficult to utilize or employ in building construction, and/or continually exposed to the elements, which limit their usefulness, or degrade their use within a period of time. Many of the focusing solar collectors of various kinds suffer the disadvantage of not collecting adequate amounts of the sun's diffuse radiance resulting from aerosol particles scattering, for example, blue sky, haze, clouds, etc. which, in areas which have significant haze, smoke and humidity, represents a significant amount of uncollected solar energy. The solar collectors were also not suitable for mounting in vertical walls of buildings for one reason or another, nor were the collecting systems versatile or efficient enough to be utilized separately from existing structures in order to supplement the heating of the building or to provide hot water therefor.

OBJECTS AND SUMMARY OF THE INVENTION

Accordingly, it is an object of the present invention to provide a new and improved focusing solar energy system which collects direct and diffuse radiation with the same or better efficiency than a flat plate collector, while providing an optical gain therefor.

A further object of this invention is to provide a new and improved focusing solar collector which provides improved solar collection efficiency, and allows the use of smaller collector plates.

Another object of this invention is to provide a new and improved solar collector which is suitable for incorporation in the vertical sidewall of a building.

Still another object of this invention is to provide a new and improved focusing solar collector system which may be used separately from an existing structure to supplement the heating and/or cooling of a building.

A further object of this invention is to provide an improved focusing solar collection system which may be manually or automatically moved to optimize solar collection as a function of season.

In carrying out this invention in one illustrative embodiment thereof, a focused solar heating system is provided having a focusing reflector with an entrance aperture and a concave reflecting surface positioned behind the entrance aperture. A solar collector plate is mounted relative to the focusing reflector in the plane of the entrance aperture, and substantially covers the lower portion of the entrance aperture when the focusing reflector is a vertical orientation. The concave reflective surface is a continuous, substantially curved surface of first and second merging curves formed, for example, by first and second radii of curvature, the first radius being substantially equal to the height of the solar collector plate and projecting from the uppermost point on the solar collector plate to form the first curve, having a cylindrical shape behind the solar collector plate. The second radius in this example is greater than the first radius, and projects from a point in front of and below the uppermost point of the first radius to form the second curve behind the entrance aperture, such that solar radiation entering the entrance aperture is effectively applied to the under side of the solar collector plate.

BRIEF DESCRIPTION OF THE DRAWINGS

FIG. 1 is a side elevation in section of an embodiment of the focusing solar energy collector system which is diagrammatic for explanatory purposes, and is also illustrated as being incorporated in a vertical wall of a building, which constitutes one embodiment of the present invention.

FIG. 2 is an isometric view of the solar collector illustrated in FIG. 1 which illustrates its general configuration.

FIG. 3 is a side elevational view, partly in section, of another embodiment of the focusing solar energy system embodied in this invention.

DESCRIPTION OF THE PREFERRED EMBODIMENTS

Referring now to FIG. 1, the focusing solar energy collection system of this invention includes a solar collector plate 10 having a front, short wavelength- transparent surface 12 and a similar rear transparent surface 14 with a grid of pipes 16 therebetween. The pipes 16 carry a liquid medium which is circulated through the pipes and is heated or cooled by the radiation applied to the collector plate 10. The liquid is circulated by conventional circulating pumps (not shown) and utilized by conventional means to heat the building or supply hot water therefor, or to cool it by radiation to the cold night sky. Since this structure does not constitute a part of the present invention, no description thereof is herein provided.

The liquid medium which is circulated in the pipes 16 may be of any suitable type, such as water, oil, or air. If required, the liquid medium may include suitable antifreeze additives to resist freezing if this is a problem. Furthermore, additives may be added for blackening the absorbing fluid to enhance the absorption of solar energy applied thereto. In another configuration which is illustrated in FIGS. 3, the collector plate 10 may be made up of transparent tubing in which a black absorbing liquid flows, or liquid may flow between two transparent plates of glass or plastic 12 anad 14 which have their perimeter sealed. The collector plate 10 may also be covered with a selective black surface which absorbs heavily in the short wavelength region between 0.4 and 2 micrometers and has a low emittance in the 2 to 20 micrometer spectral region. In all of these collector plate configurations, the collector plate 10 absorbs radiation applied on or through both its front and rear surfaces 12 and 14 as compared with a normal flat collector plate which absorbs radiation only on its front surface.

Referring now to FIG. 2, the solar energy system embodied in the present invention includes a concave reflective surface 18 bounded by reflecting side walls 17 and 19. The concave reflective surface 18 may be of any suitable material such as polished aluminum, a suitable plastic having a reflective costing thereon, or any other type of suitable mirrored surface which collects and reflects the solar energy applied thereto to the back surface 14 of the solar collector plate 10. In a vertical orientation as shown, the solar collector plate 10 is located and covers the lower portion of the focusing reflector 18 and is positioned substantially in the plane of the entrance aperture of the focusing reflector 18. The focusing reflector 18 along with its sidewalls 17 and 19, and the solar collector plate 10 mounted thereon, have a general scoop-shape configuration.

Referring again to FIG. 1, the concave reflective surface 18 which is also referred to as the focusing reflector 18 has an entrance aperture C-D, covered in part by the solar collector plate 10 from points A to D, which forms the direct entrance aperture where solar energy, both direct and diffuse, is applied directly to the front surface 12 of the solar collector 10. The remaining portion of the entrance aperture C-D comprises the reflective entrance aperture A-C. The focusing reflector or concave reflective surface 18 is made up of two curvatures B-C and B-D which are joined at point B, with point B located by passing a plane perpendicular to the entrance aperture C-D at point A and intersecting surface 18 at B. In its simplest configuration, the reflective surface 18 has a substantially cylindrical curvature from B to D, having a radius $R_1$ projecting from point A which is equal to the collector plate height A-D, with A-B being equal to A-D and perpendicular thereto. Curvature B-C is so constructed that all rays entering aperture A-C making an angle $\phi$ are either reflected by curve B-C or passed directly through the aperture A-B and are thus applied to the back surface 14 of the solar collector plate 10. Curve B-C is optimized so that the vertical ray angle $\phi$ is maximized concurrently with the dimension A-C, thereby maximizing the elevation angle entrance product of rays passing through A-C which also pass through A-B. Once having passed through A-B the rays may or may not be reflected by the curve B-D, but they all finally reach the rear surface 14 of the collector plate 10 and accordingly are absorbed thereby.

The simplest construction of curve B-C is obtained by centering a radius $R_2$ of approximately $3R_1$ at a point P in the zone in front of and below the normal to direct entrance aperture A-D at point A. This arrangement results in a dimension A-C being 2 times A-D and a value of $\phi$ equal to approximately 95° to 100°. Since the flat ends 17 and 19 of the focusing reflector 18 are parallel and reflective, a solid angle ray bundle having dimensions of 100° in elevation by 180° in azimuth passes through the reflective entrance aperture A-C, ultimately reaching the rear surface 14 of the collector plate 10. This solid angle represents 100 percent of the solid angle of diffuse sky radiation that could have been collected by a normal flat collector plate whose front surface makes an angle of 100° with the horizontal. However, since the reflecting entrance aperture A-C is 2 times the direct entrance aperture A-D, this diffuse energy as well as the direct solar energy is increased in intensity per unit collector area by a factor of approximately 2. Furthermore, since the front surface 12 of the collector plate 10 also absorbs direct and diffuse solar irradiance, the over-all gross energy gain per unit area of the collector plate, assuming 100 percent reflection and window transmission is approximately 3 to 1 as compared to a single flat collector having a vertical dimension of C-D. This results in desirably higher collector plate temperatures.

It should be emphasized that a single radius $R_2$ centered at point P represents only the simplest implementation of the invention. Further optimization using parabolic, hyperbolic, or similar curved functions for the reflective surface B-C is possible, thereby further increasing the value of reflecting entrance aperture A-C times $\phi$ solid angle combination. As is shown in FIG. 1, the solar collecting system of this invention is incorporated in the vertical sidewall 20 of a building. In this configuration, the entrance aperture C-D is vertical, in which the ratio of the reflecting entrance aperture A-C over the direct entrance aperture $$A-D \left( \frac{A-C}{A-D} \right)$$

can be made larger than 2:1 at the expense of an allowably smaller value of solid angle $\phi$, thereby increasing the energy intensity gain as compared to a singlesided vertical flat plate collector even further.

Conversely, if it is desirable to increase the elevation angle $\phi$, and/or azimuth angle, if the cylindrical axis of the focusing reflector 18 is rotated, the ratio of the reflective entrance aperture A-C to the direct entrance aperture A-D can be made smaller, resulting in a commensurate increase in the solid angle $\phi$.

In the configuration shown in FIG. 1 where the solar energy system of the present invention is embodied in a vertical sidewall of a building, the reflecting surface B-C can be made partially transparent. In this way, occupants of the building can look out, and sunlight can some in through the window formed by the reflecting entrance aperture A-C, thus allowing the solar collector to form part of a usable sidewall which significantly increases the area providing solar energy collection without reducing substantially the window area of the building. This also provides desirable solar shading or reflective glass, thereby reducing solar heat loads for the building air conditioning in the summer. In this configuration the amount of solar energy collected by the solar collector plate 10 is reduced only a relatively small amount, because it is characteristic of partially transparent aluminized coatings that they transmit well, e.g. 10-20 percent in the 0.4 to 0.5 micrometers bluegreen visible region of the spectrum, while the reflectivity of such a coating rapidly increases at longer wavelengths, i.e. 0.6 to 2.0 micrometers where most of the solar heat energy is located in the spectrum.

The entire entrance aperture C-D is preferably covered with a transparent material such as a glass plate or transparent plastic 22 which would protect both the collector plate 10 and the reflecting surface 18 from the elements. Otherwise a build-up of moisture in the form of rain, snow, or other precipitation, or a buildup of dust, soot, or other environmental deposits would seriously hamper the proper functioning of the solar collection system.

Referring now to FIG. 3, where the same elements are provided with the same reference numerals as in the previous figures, solar energy collection system may be mounted on a frame 24 which may be either incorporated in an existing structure or utilized separately therefrom. As shown in FIG. 3, an arm 26 is attached to the focusing reflector 18 and is adjustably mounted on the frame 24 in order to position the focusing reflector 18 in compromise positions for optimizing solar collections during the various seasons of the year. In FIG. 3 a winter position, a spring and fall position, and a summer position are illustrated, in which the focusing reflector 18 is selectively lowered from a vertical position in order to better track the sun for the various seasonal changes of its position.

Also illustrated in FIG. 3 is the use of a black absorbing liquid medium which flows between two transparent plates 12 and 14 of glass or plastic which have a peripheral seal, instead of the piping arrangement illustrated in FIG. 1.

A flat or slightly cylindrically curved reflective flap 28 is also illustrated in FIG. 3, which may be hinged for manual or automatic closing of the entrance aperture of the solar collector. The reflective flap 28 provides additional optical gain for the front surface 12 of the collector plate 10. Also illustrated in FIG. 3 is the use of one or more slightly tilted flat reflective surfaces 30 and 32 at the bottom of the collector plate 10 where the lower portion of the curved cylindrical surface 18 meets the collector plate 10. A further improvement in efficiency can be obtained by using the flat reflective surfaces 30 and 32 in back of and at the bottom of the collector plate 10. Rays 27, reflecting from the upper reflective surface 18, which make a highly glancing angle with the rear collector surface 14, have a high reflectance and a poor transmittance through this surface, as well as a poor absorption in the collector plate. However, these reflected rays are in turn reflected back through the surface 14 into the collector 10 by the tilted flat reflective surfaces 30 and 32, thereby increasing collection efficiency. It should be observed that the flat reflective surfaces, whether one or two are utilized, still provide a substantially cylindrical curvature behind the collector plate 10 so that most of the energy passing through points A and B of FIG. 1 eventually winds up on the back surface 14 and accordingly is absorbed by the collector plate 10. In other words, even with one or more flat reflective surfaces such as 30 and 32, the curvature is still considered to be substantially cylindrical. To enhance performance in the embodiment of FIG. 3, the sidewalls 17 and 19 may be made transparent above and reflective below the collector plate 10.

By using aluminized or gold-coated surfaces having high reflectivity throughout the infrared spectral region, combined with glazing which is transparent in the longer wavelength infrared region (2 to 20 micrometers) or no glazing, the reflective system of this invention can significantly enhance the efficiency of airconditioning systems using radiative cooling of the night sky. In the configuration of FIG. 3 showing the reflective panel 28, radiation leaving both the front and rear surfaces 12 and 14 of collector plate 10 is ultimately directed to the cold sky. This increases the radiative heat loss per unit area of the collector plate 10 ideally by a factor of 2:1 and more practically by a factor of 1.8:1 as compared with a single sided collector plate which acts as a radiator when directed toward the cold sky. This significantly reduces the equilibrium temperature achieved by the plate 10 and thereby enhances the efficiency of a radiatively cooled airconditioning system. Such a system can be used both day and night by rotating the entrance aperture so that it faces north, thereby seeing only cold sky even in the daytime.

Merely as an illustrative example, the solar energy system may be constructed having an entrance aperture of 8' × 8' with the flat collector plate being 3' × 8' and covering the bottom portion of the entrance aperture. Assuming an average multiple bounce reflectance of approximately 75 percent, the over-all gain of such a system would be 2.25.

The system embodied in the invention could be utilized to provide heating of a structure, to supplement the heating of a structure, cooling of the structure, hot water for a structure, etc. The beauty of the present invention is that it provides all of the characteristics of a flat collector and in addition provides optical gain. The invention enables the use of a smaller collector plate but still permits the collection of solar radiation over a broad area. In effect, the field of view of the collector plate is optimized to the point where the solar collector plate looks only where most of the solar energy is coming from.

Since other changes and modifications, varied to fit particular operating environments, will be apparent to those skilled in the art, the invention is not considered limited to the examples chosen for purposes of disclosure, and covers all changes and modifications which do not constitute departures from the true spirit and scope of this invention.

I claim:

1. A focused solar heating system for collecting both off- and on-axis direct and diffuse solar radiation and applying such radiation to a solar collector, comprising in combination
    a. focusing reflector having an entrance aperture and a concave reflecting surface positioned behind said entrance aperture,
    b. a solar collector plate mounted on said focusing reflector generally in the plane of said entrance aperture and substantially covering a lower portion of said entrance aperture when the curvature axes of said focusing reflector are in a horizontal orientation,
    c. said solar collector plate being blackened or selectively absorbing on both front and rear surfaces thereof and forming a direct entrance aperture with the remainder of said entrance aperture forming a reflective entrance aperture,
    d. said concave reflective surface being a continuous, substantially curved surface of first and second merging curves formed by first and second radii of curvature, the first radius being substantially equal to the height of said solar collector plate and projecting from the uppermost point on said collector plate to form said first curve having a cylindrical shape behind said solar collector plate, said second radius being greater than said first radius and projecting from a point in front of and below said uppermost point of said first radius to form said second curve behind said reflecting entrance aperture such that solar radiation entering said reflecting entrance aperture is reflectively applied to the rear side of said solar collector plate.

2. The structure set forth in claim 1 wherein said curves are cylindrical and wherein said second radius is approximately three times said first radius.

3. The structure set forth in claim 1 wherein said entrance aperture is covered by transparent material.

4. The structure set forth in claim 1 wherein said focusing reflector is mounted as a part of a vertical wall of a building, wherein part of said focusing reflector is partially transparent in the visible region of the spectrum and reflective at longer wavelengths where most of the solar energy lies, the remainder being totally reflective.

5. The structure set forth in claim 1 wherein said focusing reflector is mounted on adjustable means for positioning said focusing reflector to track the position of the sun to optimize the collection of solar radiation regardless of the position of the sun.

6. The structure set forth in claim 1 wherein a movable reflective surface is mounted on the collector plate end of said focusing reflector to increase the collection area of solar radiation applied to said entrance aperture of said focusing reflector.

7. The structure set forth in claim 1 wherein said concave reflecting surface is bounded by reflective sidewalls.

8. The structure set forth in claim 1 wherein said concave reflecting surface is bounded by sidewalls which are transparent adjacent said second curve above said collector plate and reflective adjacent said first curve.

9. The structure set forth in claim 1 wherein said collector plate has transparent front and rear surfaces with a black fluid enclosed therebetween which constitutes the solar absorbing medium.

10. A focusing radiation cooling system positioned in heat-exchange relation with respect to the cold sky for cooling a fluid medium circulating in the system, comprising in combination a. a focusing reflector having an entrance aperture and a concave reflecting surface positioned behind said entrance aperture, b. a radiating plate having an infrared emitting coating applied to both front and rear surfaces with a circulating fluid medium enclosed therebetween which is desired to be cooled, said radiating plate being mounted on said concave reflecting surface generally in the plane of said entrance aperture whereby a direct heat exchange relationship is established for said front surface of said radiating plate and reflective heat exchange relationship is established by said rear surface of said plate, c. said concave reflective surface being a continuous, substantially curved surface of first and second merging curves formed by first and second radii of curvature, the first radius being substantially equal to the height of said radiating plate to form said first curve having a cylindrical configuration behind said plate, said second radius being greater than said first radius and projecting from a point in front of and below the uppermost point of said first radius to form said second curve behind said entrance aperture such that radiation from said plate is reflectively emitted from said rear surface of said plate through said entrance aperture, d. said focusing reflector and radiating plate being directed toward and in heat exchange relationship with the surrounding cold sky whereby said fluid medium is cooled by said cold sky by radiation from both said front and rear surfaces of said plate.

* * * * *